US008613871B2

(12) United States Patent
Park et al.

(10) Patent No.: US 8,613,871 B2
(45) Date of Patent: Dec. 24, 2013

(54) CONDUCTIVE NANOCOMPLEX AND METHOD OF MANUFACTURING THE SAME

(75) Inventors: Hae Jun Park, Daejeon (KR); Hwa-Jung Kim, Daejeon (KR); Sang Hyun Park, Jeollabuk-do (KR)

(73) Assignee: Korea Atomic Energy Research Institute, Daejeon (KR)

( * ) Notice: Subject to any disclaimer, the term of this patent is extended or adjusted under 35 U.S.C. 154(b) by 537 days.

(21) Appl. No.: 12/936,957

(22) PCT Filed: Apr. 9, 2010

(86) PCT No.: PCT/KR2010/002217
§ 371 (c)(1),
(2), (4) Date: Oct. 8, 2010

(87) PCT Pub. No.: WO2010/117245
PCT Pub. Date: Oct. 14, 2010

(65) Prior Publication Data
US 2011/0031450 A1 Feb. 10, 2011

(30) Foreign Application Priority Data

Apr. 10, 2009 (KR) .......... 10-2009-0031534

(51) Int. Cl.
*H01B 1/02* (2006.01)
*H01B 1/16* (2006.01)
(52) U.S. Cl.
USPC ........... 252/514; 252/513; 252/512; 427/532; 427/551
(58) Field of Classification Search
USPC ........... 252/514, 513, 512; 427/532, 551
See application file for complete search history.

(56) References Cited

U.S. PATENT DOCUMENTS

| 6,800,709 B2* | 10/2004 | Aert et al. | 526/229 |
| 2002/0173610 A1* | 11/2002 | Aert et al. | 526/303.1 |
| 2003/0124259 A1* | 7/2003 | Kodas et al. | 427/376.6 |
| 2013/0043862 A1* | 2/2013 | Park et al. | 324/76.11 |

FOREIGN PATENT DOCUMENTS

KR 10-0837046 B1 6/2008

OTHER PUBLICATIONS

Park, Hae-Jun, et al., "Radiolytic Synthesis of Hybrid Silver Nanoparticles and their Biobehavior", Key Engineering Materials, 342-343 (2007), 897-900.*
Lee, Y. et al., In-situ formation of gold nanoparticle/conducting polymer nanocomposites, Mol.Cryst.Liq.Cryst., vol. 407, pp. 1/[397]-6/[402], 2003.
Stejskal, J. et al., The reduction of silver nitrate with various polyaniline salts to polyaniline-silver composites, Reactive & Functional Polymers, 69, pp. 86-90, 2009.
Park, H. et al., Synthesis of a new electrically conducting nanosized ag-polyaniline-silica complex using y-radiolysis and its biosensing application,Radiation Physics and Chemistry, 79, pp. 894-899, 2010.
Korean international search report PCT/KR2010/002217 dated Nov. 19, 2010.

* cited by examiner

*Primary Examiner* — Douglas Mc Ginty
(74) *Attorney, Agent, or Firm* — McCormick, Paulding & Huber LLP

(57) ABSTRACT

Provided is a nanocomplex comprising a core consisting of a metal; and a periphery being formed on a surface of the core to surround the core and consisting of an inorganic substance and a conductive polymer.

7 Claims, 7 Drawing Sheets
(3 of 7 Drawing Sheet(s) Filed in Color)

CONDUCTIVE NANOCOMPLEX AND METHOD OF MANUFACTURING THE SAME

CROSS REFERENCE TO RELATED APPLICATIONS

This application is entitled to the benefit of and incorporates by reference essential subject matter disclosed in International Patent Application No. PCT/KR2010/002217 filed on Apr. 10, 2010 and Korean Patent Application No. 10-2009-0031534 filed Apr. 10, 2009.

TECHNICAL FIELD

The present invention relates to a conductive nanocomplex and a manufacturing method thereof, and more particularly, to a conductive nanocomplex of which a stability and a conductivity are improved and a simplified conductive nanocomplex manufacturing method.

BACKGROUND ART

Most of conventional conductive materials may have structures that are easily ionized in a general aqueous solution and may show instable reactivity, and thus, may not function as the nanocomplex after emersion in the general aqueous solution.

Specifically, when the conventional conductive materials are synchronized generally based on an Ex-site scheme or an In-situ scheme. The manufacturing methods may have complex manufacturing operations, may use a great amount of time, may have a high cost, and may have a difficulty in controlling a structure and a shape at a nano-level.

Also, polyvinylpyrrolidone (PVP) is conventionally used when a metal nano particle is manufactured. However, a substitute material may be required due to a high unit cost. In addition, a dopant, such as camphorsulfonic acid (CSA) and dodecylbenzenesulfonic acid (DBSA) may be conventionally used to improve an electric conductivity.

DISCLOSURE OF INVENTION

An aspect of the present invention provides a conductive nanocomplex that has an improved stability and an improved conductivity, and a dramatically improved conductive nanocomplex manufacturing method.

According to an example of the present invention, there may be provided a nanocomplex, and the nanocomplex includes a core consisting of a metal, and a periphery being formed on a surface of the core to surround the core and consisting of an inorganic substance and a conductive polymer.

According to an example of the present invention, there may be provided a nanocomplex manufacturing method, and the method includes mixing a metal precursor compound, a conductive monomer, and an inorganic salt to prepare a reaction solution, injecting a gas to the reaction solution to perform bubbling of the reaction solution, and irradiating a radiation to the bubbled reaction solution.

According to the present invention, there may be provided a conductive nanocomplex that has a stable structure and an improved conductivity.

According to the present invention, there may be provided a conductive nanocomplex manufacturing method that may simultaneously manufacture a nanocomplex in the same space, and thus, a manufacturing process is short and safe, a manufacturing cost is reduced, and a size and a configuration of the nanocomplex is easily controlled.

BRIEF DESCRIPTION OF DRAWINGS

The patent or application file contains at least one drawing executed in color. Copies of this patent or patent application publication with color drawing(s) will be provided by the Office upon request and payment of the necessary fee.

BEST MODE FOR CARRYING OUT THE INVENTION

Figure 1:
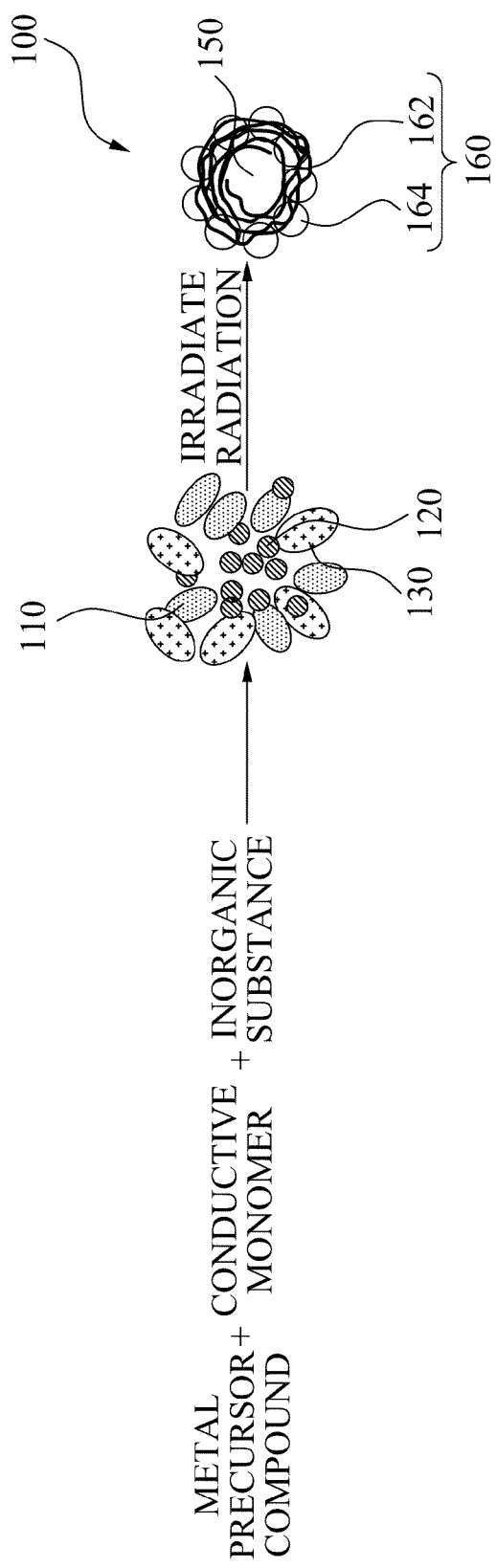
FIG. 1 is a diagram illustrating a conductive nanocomplex and a manufacturing process thereof according to an embodiment of the present invention.
Figure 2A:
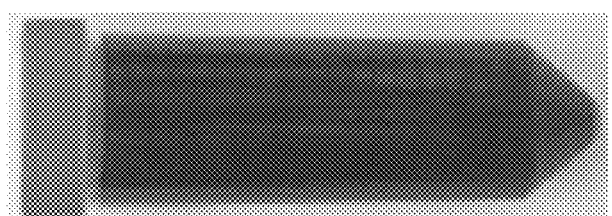
FIG. 2 is a photo of a reaction solution after irradiating a gamma ray to the reaction solution in Example 1.
Figure 2B:
Figure 2B:
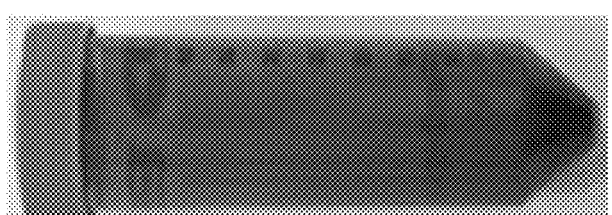
Figure 2C:
Figure 2C:
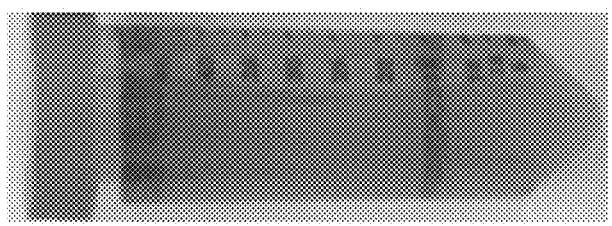
Figure 2D:
Figure 2D:
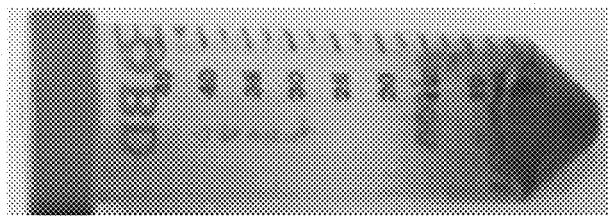

FIG. 1 illustrates a conductive nanocomplex and a manufacturing process thereof according to an embodiment of the present invention.

Referring to FIG. 1, a conductive nanocomplex 100 may include a core 150 and a periphery being formed on a surface of the core 150 to surround the core 150, the periphery consisting of a conductive polymer 162 and an inorganic substance 164.

The core 150 may include a reducing metal. For example, the core 150 may include the reducing metal, such as silver, copper, gold, platinum, palladium, nickel, and the like. The periphery 160 may consist of the conductive polymer 162 and the inorganic substance 164, and at least a portion of the conductive polymer 162 and at least a portion of the inorganic substance 164 may be chemically combined. For example, the conductive polymer 162 and the inorganic substance 164 may have a complex structure where the conductive polymer 162 and the inorganic substance 164 are cross-linked or may have a structure that sequentially surrounds the core 150.

The conductive polymer 162 may be an inclusive concept including a conductivity polymer having a π electron backbone, and may include polyaniline, polythiophene, polypyrrole, polyindole, polyacetylene, and their derivatives.

The inorganic substance 164 may be used for controlling the conductivity and used for a stability and a fixation of a metal nano particle, and examples of the inorganic substance 164 may include a Si-containing substance, such as silica, silicon, and the like, a metalloid compound, and the like.

According to a result of a Scanning electron microscopy/Transition electron microscopy (SEM/TEM) analysis, the conductive nanocomplex 100 may be shaped in uniform globular particles being about 1 to 100 nm in diameter.

Hereinafter, a conductive nanocomplex manufacturing method according to the present invention is described in detail.

Referring again to FIG. 1, a metal precursor compound 120, a conductive monomer 110, and an inorganic salt 130 are mixed to prepare a reaction solution, a gas is injected to the reaction solution to perform bubbling of the reaction solution, and a radiation is irradiated to the bubbled reaction solution, and thus, the conductive nanocomplex 100 may be manufactured.

Specifically, the preparing the reaction solution may begin with preparing each of the metal precursor compound 120, the conductive monomer 110, and the inorganic salt 130.

The metal precursor compound 120 may include metal salts of silver, gold, copper, nickel, platinum, or palladium, the metal salts including, for example, nitric acid, nitric sulfate, silver sulfate, silver chloride, copper chloride, copper nitrate, nickel nitrate, and the like. The conductive monomer 110 may include aniline, thiophene, pyrrole, indole, acetylene, their derivatives, and the like. The inorganic salt 130 may include a Si-containing inorganic salt, such as sodium silicate ($Na_2SiO_3$) and the like.

The reaction solution may include about 0.1 to 1.0 parts by weight of the metal precursor compound, 0.1 to 1.0 parts by weight of a conductive monomer, and 0.1 to 1.0 parts by weight of inorganic salt with respect to 100 parts by weight of solvent.

When the metal precursor compound 120, the conductive monomer 110, and the inorganic salt 130 are prepared, the metal precursor compound 120, the conductive monomer 110, and the inorganic salt 130 are mixed. In this case, a time of mixing may not be restricted. When the mixing is sufficiently performed, the reaction solution may be stored at room temperature.

Subsequently, the gas is injected to the reaction solution to perform bubbling of the reaction solution. The gas is used for bubbling of the reaction solution, and an inert gas, such as nitrogen and the like may be used as the gas. The bubbling may continue until the bubbling is sufficiently performed. Although the time of the bubbling is not restricted, the bubbling may be performed for about 5 minutes to 30 minutes in consideration of a workability and a process efficiency.

Subsequently, the radiation may be irradiated to the bubbled reaction resolution. A type of the radiation may not be restricted and a gamma ray, for example, may be irradiated.

EXAMPLE

Example 1

Silver nitrate ($AgNO_3$) of a predetermined concentration, an aniline monomer, sodium silicate ($Na_2SiO_3$), and isopropyl alcohol (IPA) were sequentially put into tertiary distilled water and were stirred to generate a reaction solution. After the reaction solution was stored for about an hour and a half at room temperature, a nitrogen gas was injected to the reaction solution to be bubbled for about 30 minutes. The bubbled reaction solution was irradiated with a gamma ray, and a total amount of the gamma ray was 30 kGy.

FIG. 2 is a photo of the reaction solution after radiating the gamma ray.

Referring to FIG. 2, after the gamma ray was irradiated, the reaction solution was in a condition of being a dark brown aqueous solution of an image a. After the dark brown aqueous solution was centrifuged for about 20 minutes at 25° C., the dark brown aqueous solution may be in a condition of being an aqueous solution that is layered with a Nano silver silica polyaniline (NSS-PAI) material of an image b. The aqueous solution that is layered with the NSS-PAI may be separated, through centrifuging, into a supernatant of an image c and a black precipitation of an image d.

SEM/EDX and TEM Analysis of NSS-PAI Nanocomplex

To determine a reproducibility of identifying of a structure and shape of an NSS-PAI nanocomplex, a Field Emission-Scanning Electron Microscopy (FE-SEM, SU-70, HITACHI, JAPAN) and an Energy Dispersive X-Ray Spectroscopy (EDX) analysis were performed.

A synthesized NSS-PAI material was separated into a supernatant and a precipitation through centrifuging. The supernatant was dropped on an indium tin oxide (ITO) glass and was dried with warm air for a day at 64° C., and the precipitation was dried with warm air for a day at 64° C. and was prepared to be in fine particles.

Figure 3:
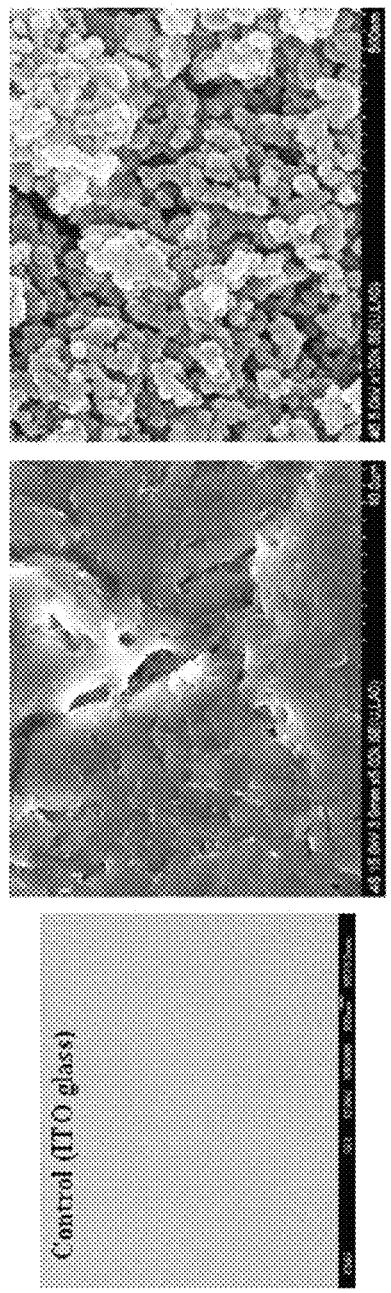
FIG. 3 is a photo of an FE-SEM of a supernatant and a precipitation generated in Example 1.
Figure 4A:
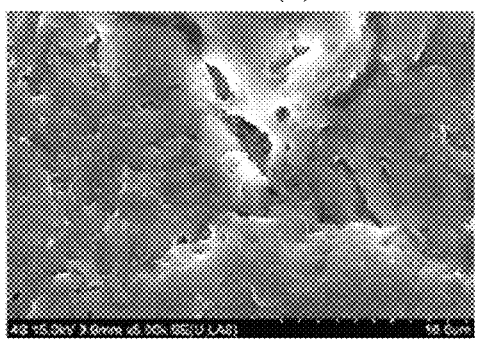
FIG. 4 is a photo of an FE-SEM and an EDX result with respect to a supernatant and a precipitation generated in Example 1.
Figure 4A:
Figure 4A:
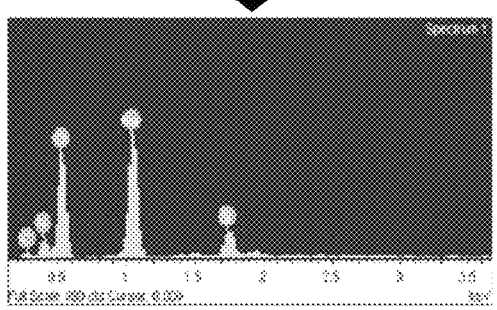
Figure 4B:
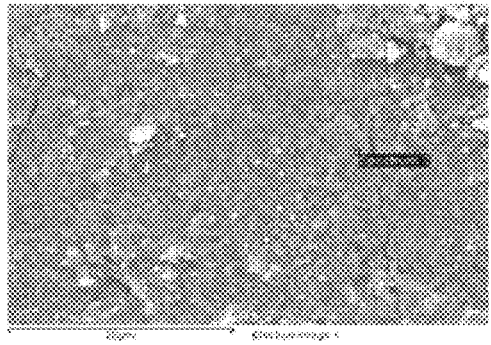
Figure 4B:
Figure 4B:
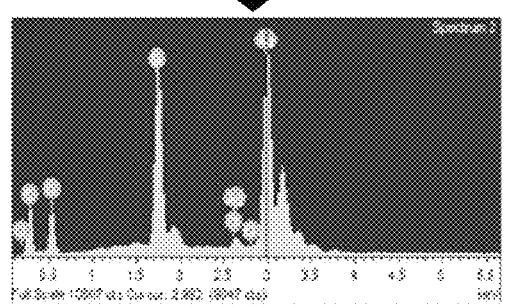

FIG. 3 is a photo of FE-SEMS of the supernatant and the precipitation generated in Example 1, and FIG. 4 is a photo of an FE-SEM and an EDX result with respect to the supernatant and the precipitation generated in Example 1.

Referring to FIGS. 3 and 4, according to a FE-SEM/EDX result, surfaces of the supernatant of an image a of FIG. 3 and an image a of FIG. 4 are observed as being in a shape of a film and are observed as being soft. A shape that is estimated as a nano particle or a silver nano particle is not observed. An NSS-PAO nanocomplex particle is observed mainly from the precipitation of an image b of FIG. 3 and an image b of FIG. 4.

Figure 5B:
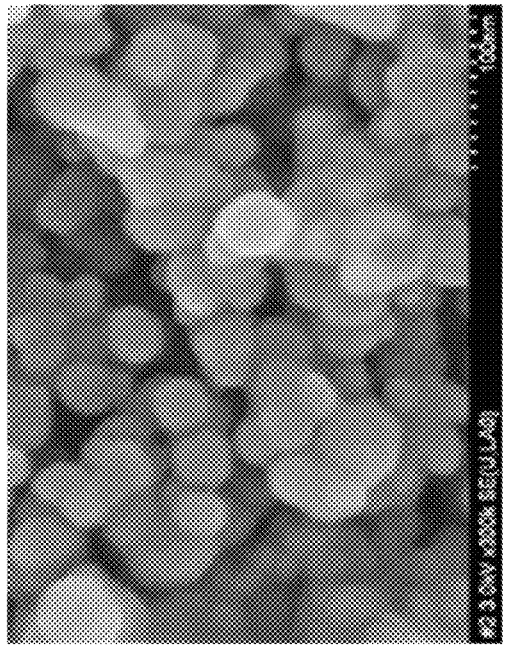
FIG. 5 is a photo of an FE-SEM of a nano silver silica polyaniline (NSS-PAI) nanocomplex at a 500 nm scale (FIG. 5($a$)) and at a 100 nm scale (FIG. 5($b$))
Figure 5A:
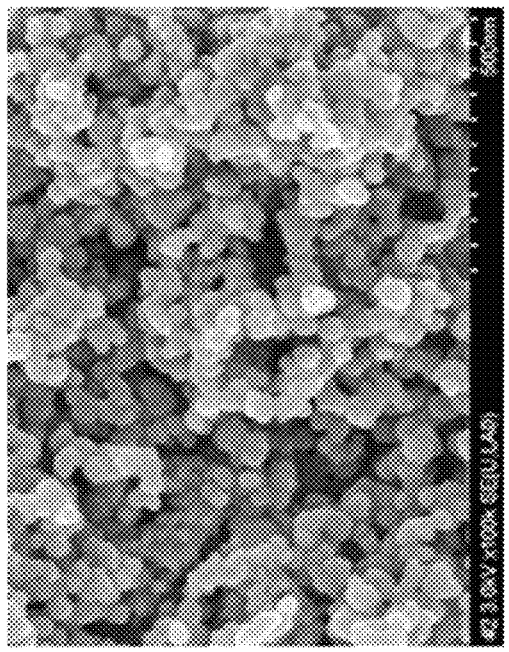

FIG. 5 is a photo of an FE-SEM of an NSS-PAI nanocomplex at a 500 nm scale and at a 100 nm scale. Referring to FIG. 5, the NSS-PAI nanocomplex may be a globular particle having a size of about 30 nm.

Figure 6B:
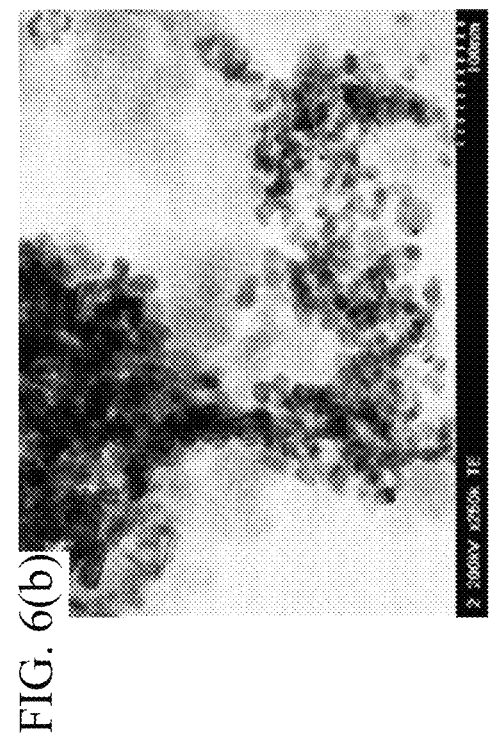
FIG. 6 is photo of a transition electron microscopy analysis results of an NSS-PAI nanocomplex at a 50 nm scale (FIG. 6($a$)), at a 100 nm scale (FIG. 6($b$)), and at a 10 nm scale (FIG. 6($c$))
Figure 6C:
Figure 6A:

FIG. 6 is a photo of a transition electron microscopy analysis result of an NSS-PAI nanocomplex at a 50 nm scale, at a 100 nm scale, and at a 10 nm scale. Referring to FIG. 6, according to a result of a TEM analysis, a silver-nano particle exists at a center as a core of the NSS-PAI nanocomplex, and at least a portion of polyaniline and at least a portion of silica are chemically combined to surround a surface of the core.

Irradiation of Absorption Spectrum to NSS-PAI Nanocomplex

The precipitation obtained from Example 1 was put into an ethanol solvent, ultrasonic wave dispersion was performed for about an hour using an ultrasonic disintegrator (5510E-DTH, BRANSON UL TRASONICS CORPORATION, USA), and the absorption spectrum was irradiated using an UV/VIS spectrophotometer (GENESYS 10-S, THERMO ELECTRON CORPORATION, USA).

Figure 7A:
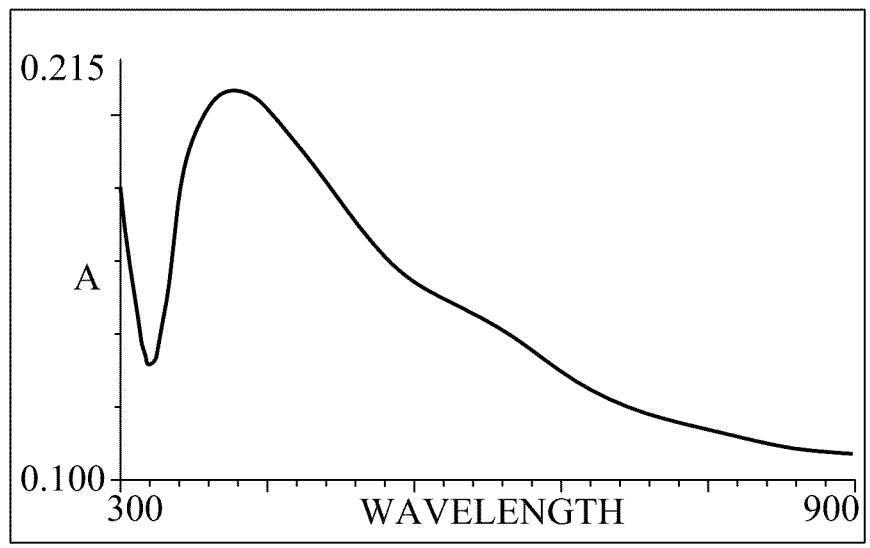
FIGS. 7($a$) and 7($b$) are diagrams illustrating UV/VIS spectrum results with respect to an NSS-PAI nanocomplex and nano silver silica (NSS).
Figure 7B:
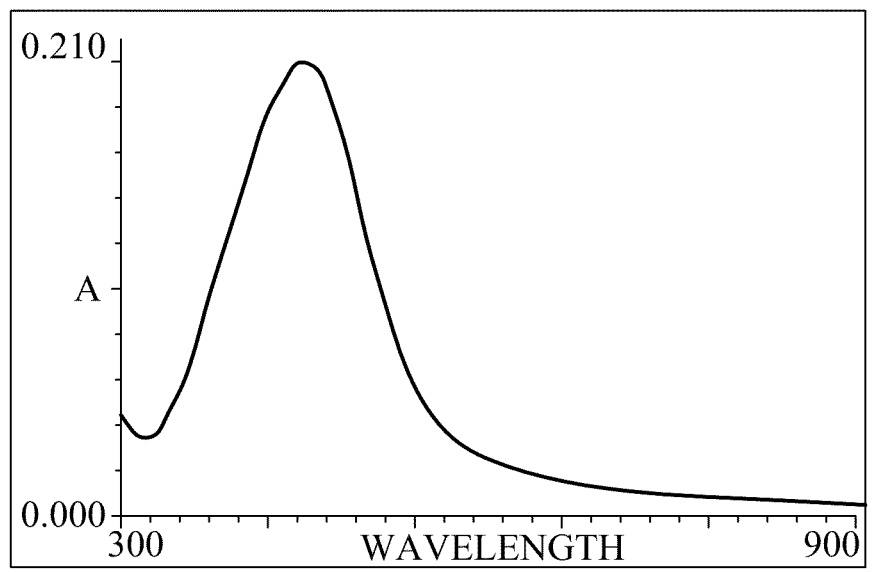

FIGS. 7($a$) and 7($b$) are diagrams illustrating UV/VIS spectrum results with respect to an NSS-PAI nanocomplex and nano silver silica (NSS). A graph a illustrates a result of UV/VIS spectrum result of an NSS-PAI nanocomplex and a graph b illustrates a result of UV/VIS spectrum result of nano silver silica (NSS)

Referring to FIG. 7, the two substances show different tendencies. In a case of NSS of the graph b, a silver-nano particle has a unique surface plasmon resonance (SPR) of a nano metal particle, and thus, an absorption peak of the silver-nano particle may be displayed at 420 nm, which indicates that a silver-nano particle having a size of 20 nm exists. In the case of NSS-PAI of the graph a, an absorption peak is not displayed at 400 nm wavelength range. Instead, a broad absorption peak is observed at about 370 nm due to $\pi$-$\pi$ transition of polyaniline, which indicates the NSS-PAI nanocomplex has a complex structure.

Measuring Electric Conductivity of NSS-PAI Nanocomplex

To measure the electric conductivity of the NSS-PAI nanocomplex, the NSS-PAI nanocomplex was prepared as fine particles, was manufactured as a round pellet being 14 nm in diameters, was subjected to a first press with a pressure of 2.5 tons, and was pressed with a weight of 5 tons for about one minute. A Van der Pauw was used as a measuring method, and K4200 SCS (Keithley Instrument Corporation, USA) was used as a measuring apparatus.

The electric conductivity of the NSS-PAI nanocomplex was compared with polyaniline (PANI), NSS, and silica, and the comparison is as given in Table 1.

TABLE 1

| | Thickness(mm)/ Diameter(mm) | Source current (A) | Resistivity (ohm.cm) | Conductivity at Room temp. |
|---|---|---|---|---|
| [a]NSS-PAI | 0.45/14 | $1.00 * 10^{-2}$ | $4.48 * 10^{-3}$ | $2.23 * 10^{2}$ |
| [b]PANI | 1.13/12.6 | $1.00 * 10^{-1}$ | $4.59 * 10^{-2}$ | $2.18 * 10^{1}$ |
| [c]NSS | 1.033/14 | $1.00 * 10^{-9}$ | $2.11 * 10^{8}$ | $0.474 * 10^{-9}$ |
| [d]Silca | 0.35/12.6 | $1.00 * 10^{-9}$ | $8.53 * 10^{7}$ | $1.17 * 10^{-8}$ |

[a]a nanocomplex synthesized by irradiating a gamma ray to $AgNO_3$, aniline monomer and $Na_2SiO_3$
[b]PANI chemically synthesized from an aniline monomer
[c]a nano silver silica complex synthesized from $AgNO_3$ and $Na_2SIO_3$
[d]silica chemically synthesized from tetraethylorthosilicate (TEOS)

The NSS-PAI nanocomplex is different from NSS in that the NSS-PAI nanocomplex uses aniline instead of PVP. Generally, a dopant is used to improve an electric conductivity of a conductive high polymer. However, the NSS-PAI nanocomplex has a maximum electric conductivity of 223 S/cm without using the dopant and thus, the electric conductivity is improved by about $10^{11}$ times compared with NSS.

Although a few example embodiments have been shown and described, it would be appreciated by those skilled in the art that changes may be made in these example embodiments without departing from the principles and spirit of the invention, the scope of which is defined in the claims and their equivalents.

While the present invention has been illustrated and described with respect to a particular embodiment thereof, it should be appreciated by those of ordinary skill in the art that various modifications to this invention may be made without departing from the spirit and scope of the present invention.

The invention claimed is:

1. A nanocomplex, comprising:
a core consisting of a metal; and
a periphery being formed on a surface of the core to surround the core and consisting of an inorganic substance and a conductive polymer.

2. The nanocomplex of claim 1, wherein the metal is a reducing metal.

3. The nanocomplex of claim 2, wherein the metal includes at least one selected from a group consisting of silver, copper, gold, platinum, and nickel.

4. The nanocomplex of claim 1, wherein the inorganic substance is a Si-containing substance.

5. The nanocomplex of claim 1, wherein the conductive polymer includes at least one polymer selected from a group consisting of polyaniline, polythiophene, polypyrrole, polyindole and polyacetylene.

6. The nanocomplex of claim 1, wherein the periphery comprises:
a first periphery being formed on the surface of the core and consisting of the conductive polymer; and
a second periphery being formed to surround the first periphery and consisting of the inorganic substance.

7. The nanocomplex of claim 1, wherein at least a portion of the conductive polymer and at least a portion of the inorganic substance are chemically combined.

* * * * *